| United States Patent [19] | [11] Patent Number: 5,023,168 |
|---|---|
| Johnson | [45] Date of Patent: Jun. 11, 1991 |

[54] SYNTHESIS OF POLYSILOXY CONTAINING NAPHTHALOCYANINE COMPOUNDS USING CYCLOSILOXANES

[75] Inventor: Robert E. Johnson, Hoboken, N.J.

[73] Assignee: Hoechst Celanese Corp., Somerville, N.J.

[21] Appl. No.: 487,697

[22] Filed: Mar. 1, 1990

[51] Int. Cl.$^5$ .................. G03C 1/00; G03C 1/72
[52] U.S. Cl. .................. 430/495; 430/270; 430/945; 540/128; 540/140; 428/64
[58] Field of Search ............ 540/128, 142; 430/270, 430/495, 945; 428/64

[56] References Cited

U.S. PATENT DOCUMENTS 4,725,525  2/1988  Kenny et al. .................. 430/495

Primary Examiner—Charles L. Bowers, Jr.
Assistant Examiner—Ashley I. Pezzner
Attorney, Agent, or Firm—P. S. Kalyanaraman

[57] ABSTRACT

Provided is a method for preparing polysiloxy containing naphthalocyanine compounds. The method comprises reacting a cyclosiloxane with a nucleophile to open the ring of the cyclosiloxane. The ring opened cyclosiloxane is then reacted with a naphthalocyanine precursor and a capping group compound. The nucleophile can perform the dual role of the nucleophile and the capping group compound. The method permits the preparation of siloxane containing naphthalocyanine compounds in a more proficient manner through the use of cyclosiloxanes as reactants.

16 Claims, No Drawings

SYNTHESIS OF POLYSILOXY CONTAINING NAPHTHALOCYANINE COMPOUNDS USING CYCLOSILOXANES

BACKGROUND OF THE INVENTION

The present invention pertains generally to the preparation of naphthalocyanine compounds. More particularly this invention relates to a method for preparing naphthalocyanine compounds from cyclosiloxanes, which naphthalocyanine compounds are useful in the information layer of optical recording media.

Siloxane containing compounds are known and have been recognized as possessing great thermal stability and intense color. Because of their high thermal stability and intense color, siloxane polymers could prove useful in a wide variety of applications, e.g., coatings or dyes.

For example U.S. Pat. Nos. 4,131,609 and 4,132,842 describe silicon phthalocyanine-siloxy polymers of the general formula PcSi(OSiR'Ph(OSiR''$_2$)$_r$X)$_2$ and (PcSiOSiR'Ph(OSiR''$_2$)$_n$OSiR'PhO)$_x$. It is noted in the background of U.S. Pat. No. 4,132,842 that "siloxy monomers" containing a phthalocyanine nucleus would be useful as dyes, coatings, and toughening agents for highly thermally stable resins except that the known siloxane-phthalocyanine copolymers are insoluble, nonmeltable, and noncrosslinkable. The insolubility of the siloxane-phthalocyanine copolymers seriously limit their workability and usefulness as coatings. The synthesis of siloxane-phthalocyanine copolymers having high solubility in organic and polar solvents is apparently accomplished by the use of siloxane-phthalocyanine disilanols or bis(dialkylamino)siloxanes with specific co-monomers having both phenyl and alkyl substituents on the silicon adjacent to the phthalocyanine nucleus Although compounds containing siloxanes offer uncommonly good thermal stability, the backbone tends to form a helical structure which aids in the formation of cyclic siloxanes at elevated temperatures. To avoid this problem, the prior art employs a modified siloxane containing compound formed by combining siloxane copolymers with organic and inorganic groups to inhibit the reversion to cyclics through steric and/or electronic effects. This method, however, has the inherent disadvantage of lengthy and costly preparation.

Because of the potential value of such thermally stable siloxane containing compounds, it would be advantageous if useful siloxane containing compounds could be manufactured more efficiently and simply.

Siloxy containing naphthalocyanine compounds, and in particular silicon naphthalocyanine chromophores, have been suggested for use in optical media. For example, see U.S. Pat. No. 4,725,525. A more efficient and simple method for preparing such siloxy containing compounds, therefore, would be of great benefit to the art.

Accordingly, it is an object of the present invention to prepare a siloxane containing compound more directly, efficiently and inexpensively.

It is another object of the present invention to provide a more efficient and cost effective process for preparing a naphthalocyanine compound containing a polysiloxane moiety.

Yet another object of the present invention is to provide a method for producing a polysiloxy containing naphthalocyanine compound which exhibits excellent optical recording properties and a high level of solubility in organic solvents.

These and other objects, as well as the scope, nature, and utilization of the invention, will be apparent to those skilled in the art from the following description and the appended claims.

SUMMARY OF THE INVENTION

In accordance with the foregoing objectives, there is provided a method for preparing a naphthalocyanine compound which comprises:

(a) reacting a cyclosiloxane with a nucleophile to open the ring of the cyclosiloxane, and (b) reacting the ring-opened cyclosiloxane with a naphthalocyanine precursor followed by a capping group compound. In a preferred embodiment, the nucleophile performs the dual role of the nucleophile and the capping group compound.

The foregoing method permits the preparation of siloxane containing naphthalocyanine compounds more effectively and efficiently through the use of cyclosiloxanes as reactants.

By coating a film comprised of the siloxy containing naphthalocyanine compound prepared by the process of the present invention onto a suitable substrate, an optical information storage medium possessing excellent optical properties can be prepared. It has been found that the use of the siloxy containing naphthalocyanine compound allows for the intense absorption of light at a specified wavelength, i.e., in the range of from about 700–850 nm. Such intense absorption provides for a very sensitive recording medium, thereby permitting detailed information to be recorded with a high signal to noise ratio upon playback. Accordingly, the commercial viability of the medium is enhanced. The excellent chemical and photolytic stability of the chromophores also enhance the desirability and commercial viability of the recording medium in extending its useful life. The cost effective and simple process of the present invention further enhances the commercial usefulness of the siloxy containing naphthalocyanines prepared thereby.

DETAILED DESCRIPTION OF THE PREFERRED EMBODIMENTS

The method of preparing siloxy containing naphthalocyanine compounds through the use of ring-opened cyclosiloxanes in accordance with the present invention can be characterized according to the following equation:

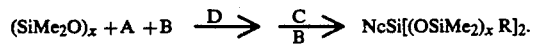

wherein x is an integer from 3 to 4; A is a nucleophile; B is a solvent; C is a capping group containing compound which contains the capping group R; and D is a naphthalocyanine precursor compound. In a specific embodiment of the present invention, the nucleophile A can also play the role of the capping group containing compound C, in which case it would not be necessary to add an additional capping group containing compound C.

Cyclosiloxanes are known compounds generally used as monomers for polysiloxanes after a nucleophilic ring opening reaction. The cyclosiloxanes used in accordance with the present invention are ring opened through the use of a nucleophile to result in linear fragments. This is accomplished by dissolving the cyclosiloxane and the nucleophile separately in suitable solvents and slowly combining the dissolved mixtures of nucleophile and cyclosiloxane while continuously agitating the combined solution. The solution is agitated for an additional length of time after the cyclosiloxane and nucleophile mixtures are combined. It is preferable to combine both the cyclosiloxane and nucleophile in the same solvent. After combining the cyclosiloxane and nucleophile, the preferable length of time for which the solution is stirred is approximately one-half hour. However, this is not critical and can vary greatly. The mixed nucleophile and cyclosiloxane solutions results in a ring-opened cyclosiloxane ready for further possible reaction.

Examples of suitable solvents for use in the process of the present invention include, but are not limited to, pyridine and tributylamine, with the most preferred solvent being pyridine.

Theoretically, any cyclosiloxane can be employed in the method of the present invention. The preferred cyclosiloxanes, however, are cyclotrisiloxanes and cyclotetrasiloxanes. A mixture of cyclosiloxanes can also be used. The use of such a mixture as a reactant can give a product that might avoid the potential crystallinity which can be observed with a pure single compound, which crystallinity is not desirable in optical information media.

The nucleophile used to open the cyclosiloxane can be any suitable nucleophilic compound known to the art. Examples of preferred nucleophiles include but are not limited to, metal amides, metal hydroxides, metal siloxanates, metal hydrocarbons, metal alkoxides, or organic silanolates. The more preferred nucleophiles are potassium triethylsiloxanate, lithium amide, and lithium alkoxide, with lithium amide being most preferred.

Once the ring of the cyclosiloxane is opened, two such siloxanes can be reacted with a naphthalocyanine compound. The cyclosiloxanes bond to the central hetero atom of the naphthalocyanine. This is accomplished by suspending/dissolving the naphthalocyanine precursor in a solvent, preferably the same solvent used to dissolve the nucleophile and cyclosiloxane, and then combining it with the solution containing the ring-opened cyclosiloxane.

The naphthalocyanine precursor of the present invention includes, but is not limited to, silicon, germanium, tellurium, and tin naphthalocyanines, with any of the dihalides and dihydroxides being appropriate. The most preferred naphthalocyanine precursors are silicon naphthalocyanine dichloride and silicon naphthalocyanine dihydroxide.

The properties of the siloxy containing naphthalocyanine compound can be favorably altered, e.g., have its solubility enhanced, by connecting specific capping group compounds onto the terminal ends of the each siloxane. Appropriate capping group compounds of the present invention include, but are not limited to, alcohols, epoxides or aliphatic silicon chlorides. The most preferred capping group compound is tripropylene glycol monomethylether, or trimethyl silicon chloride.

It is desirable to use an excess of both the capping group containing compound and the ring opened cyclosiloxane when attempting to react them with a naphthalocyanine precursor compound because an excess of the capping group compound and straight chained siloxanes tends to successfully react all the naphthalocyanine precursor. If too much of an excess of the capping group is employed, however, it can make manipulation of the capping group cumbersome and the recovery of the capping group expensive. An effective ratio of ring-opened cyclosiloxane to naphthalo-cyanine precursor ranges from about 2:1 to about 10:1 and an effective ratio of capping group compound to naphthalocyanine precursor ranges from about 2:1 to about 20:1.

It should be noted that it is also possible according to the method of the present invention to successfully complete the reaction sequence without the use of the capping group compound if the nucleophile contains an appropriate capping group that can attach to the terminal ends of the siloxane extending from the naphthalocyanine nucleus. In such a case, the nucleophile performs the dual role of nucleophile and capping group containing compound.

After adding the naphthalocyanine precursor and the capping group compound to the ring-opened cyclosiloxane solution, the resulting mixture is then refluxed for a period of time sufficient to allow the naphthalocyanine precursor to dissolve almost completely in the reaction mixture. The amount of time necessary for the dissolution of the naphthalocyanine precursor can range from about 15 minutes to 1 week, and preferably ranges from about one hour to about two days. Once dissolution occurs, the reaction will occur as discussed above to form the siloxy containing naphthalocyanine compound.

The naphthalocyanine product is then recovered by any of the conventional methods of recovery known, e.g., such as filtration. As a general example, the following procedure can be employed.

Filtration and reprecipitation is the technique used. It is preferable to filter the solution while it is still hot. The appropriate filter includes any filter that excludes all particles of size greater than approximately 0.6 microns. A second precipitation with water can then be performed to cleanse the naphthalocyanine product of impurities.

The next step in the recovery is to slurry the naphthalocyanine product with water, alcohol or both in series. The purpose behind forming a water or alcohol slurry as part of the recovery process is to further strip any impurities from the naphthalocyanine product. It is the preferred recovery method of the present invention to first slurry the naphthalocyanine product with fresh water and second with methanol.

The recovery process is completed by drying, filtering, and redrying the product. One possible means for drying the product is a simple air dry process. The subsequent filtration is accomplished through the use of a suitable solvent such as 1,1,2-trichloroethane. It is preferred to use a hot solvent solution so as to dissolve the maximum amount of the naphthalocyanine product into solution. It is desirable to filter out all particles greater than approximately 0.6 $\mu$m in size, therefore a filter such as a Whatman GF/F filter is used. A second means for drying is a vacuum dry process. The vacuum dry process keeps the product from obtaining any impurities during its final stage in the recovery. The result of vacuum drying the product of the present invention is a dark green siloxane containing naphthalocyanine compound suitable for use as a chromophore in optical information recording media.

To employ the naphthalocyanine chromophore of the present invention into an optical information recording medium requires the chromophore to be cast onto a suitable substrate material. Examples of suitable substrate materials include acrylic resins, methacrylic resins, polystyrene resins, polycarbonate resins, cellulose resins, polyester resins, polyamide resins, polyolefin resins, epoxy resins, polyimide resins, cellulose triacetate, cellulose acetate butylate, polymethylpentene, and polyethylene terephthalate. Polycarbonate resins, however, are the most preferred substrate materials because it is light, stable and difficult to break.

Conventional methods of casting may be utilized with the naphthalocyanine chromophore of the present invention. If desired or deemed necessary the chromophore of the present invention can be dissolved in a polymer film and cast accordingly on a suitable substrate. The chromophore can also be cast, per se, as a film on a suitable substrate, i.e., without the aid or presence of a film forming binder resin.

The film, when applied, must provide a very flat surface in order to avoid errors and noise. In order to facilitate the coating procedure, it is also generally advantageous that the polymer and chromophore be soluble in a readily available organic solvent such as an alcohol or ketone. In this regard the polymer and chromophore should be compatible and mutually co-soluble. Also, upon evaporation of the solvent, the chromophore should not precipitate in a particulate form, which particulates would cause a scattering of light. For this reason, the naphthalocyanine chromophore of the present invention is highly desirable. It can successfully be cast with or without the presence of a film-forming polymer to obtain a smooth layer that does not precipitate in particulate form. It is preferred according to the present invention to cast the naphthalocyanine chromophore without the use of the film-forming binder resin.

Any suitable coating technique may be used to achieve such a flat surface, with a conventional technique such as spin coating, which allows for a high degree of control of film thickness and flatness, being preferred. It is, of course, important that the polymer form a thin film coating.

The substrate which is coated should generally possess a surface of suitable smoothness. This may be imparted by appropriate molding or other forming techniques when the substrate is made. If the substrate has an inadequately smooth surface, a smoothing or subbing polymer layer may be used to attain the appropriate smoothness. Such a smoothing or subbing layer should not, of course, interfere with application or utilization of the recording layer which is subsequently applied thereto. The subbing layer can contain preformatting information.

A suitable protective layer or cover, such as those known to the art, can also be used if desired to protect the recording layer form dirt, dust, scratches or abrasion.

The following examples are given to demonstrate the synthesis of naphthalocyanine compounds in accordance with the invention. It is understood that these examples are given by way of illustration and are not meant to limit the disclosure or the claims to follow.

The standard procedure used to prepare the equipment in the examples was as follows. A 500 ml round bottom flask with a side-arm stopcock was oven dried overnight along with a magnetic stirring bar and a 100 ml equalizing pressure addition funnel. The assembly was dried further under a millitorr vacuum. The specific examples are as follows.

EXAMPLE 1

Lithium amide (0.510 g, 22.0 mmol) was added to the round bottom flask along with approximately 75 ml of anhydrous pyridine and stirred for approximately 5 minutes. Hexamethylcyclotrisiloxane (4.449 g, 20.0 mmol) was then dissolved in 75 ml of pyridine and added to the dropping funnel. The cyclotrisiloxane solution was then added to the amide slurry over a period of about one-half hour. The combination of the cyclotrisiloxane solution and the amide slurry was further stirred for another one-half hour period and then transferred to thoroughly dried 500 ml flask fitted with a reflux condenser. This flask also contained silicon naphthalocyanine dichloride (3.000 g, 3.696 mmol) suspended/dissolved in 100 ml of anhydrous pyridine. The contents were then set to reflux for one day (24 hours).

The reaction was filtered while hot through a Whitman GF/F filter, precipitated with water, and slurried further with (i) fresh water and then (ii) methanol. The product was air dried and the extraction was then repeated with hot 1,1,2-trichloroethane. A second filtration with a Whitman GF/F filter was performed and the resulting dark green product was vacuum dried.

EXAMPLE 2

Silicon naphthalocyanine dihydroxide (2.000 g, 2.581 mmol), lithium amide (0.643 g, 28.00 mmol), and octamethylcyclotetrasiloxane (6.39 ml, 20.65 mmol) were combined with 250 ml of anhydrous pyridine and set to reflux for 1.5 hours in a 500 ml flask. During the reflux period, the insoluble dichloride gradually dissolved to leave a deep green solution. Chlorotrimethylsilane (3.55 ml, 28.00 mmol) was injected into the reaction and reflux continued for 15 minutes, at which time the solution became a brighter green. The solution was then filtered through a glass fiber filter wherein particles greater than 0.6 microns were excluded. The solution was then precipitated in water. A second extraction of the solution was performed, this time using hot 1,1,2-trichloroethane. The extraction was followed by filtration through a Whitman GF/F filter and drying under a vacuum, thus yielding a dark green product.

Successful variations of the processes illustrated in Example 1 and Example 2 are plausible, which variations would directly and easily generate other functional naphthalocyanine chromophores. The variations are created by modifying any of the reactants in the reaction sequence to include other suitable nucleophiles, solvents, capping group compounds, cyclosiloxanes, and naphthalocyanine precursors. Two exemplary variations in accordance with the reaction sequence of the present invention would be as follows:

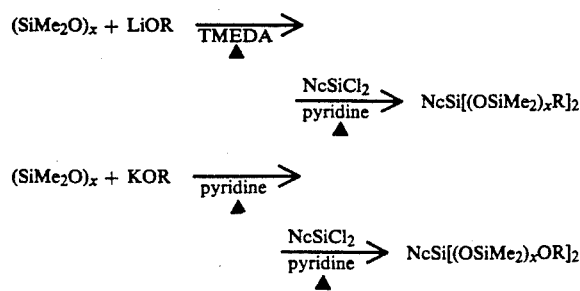

where $(SiMe_2O)_x$ represents a cyclosiloxane and x is three or four;

R represents a hydrocarbon ranging from about 1 to about 10 carbon atoms;

Nc represents naphthalocyanine; Me represents a methyl group;

TMEDA represents the solvent tetramethylethylene diamine;

▲ represents the application of heat for reflux for a period of time which ranges from about 1 hour to about 2 days.

Additional illustrative reaction schemes can also be created by choosing any one of the preferred reactants and solvents set forth below. Any permutation would generally be possible.

| I. Cyclosiloxane | II. Nucleophile | III. Solvent |
|---|---|---|
| 1. Cyclotrisiloxane | 1. Metal amide | 1. Pyridine |
| 2. Cyclotetra-siloxane | 2. Metal hydroxide | 2. Tributylamine |
|  | 3. Metal siloxanate |  |
|  | 4. Metal alkoxide |  |

| IV. Capping Group | V. Nc precursor |
|---|---|
| 1. Tripropylene glycol mono-methylether | 1. Silicon or other Naphthalocyanine dichloride (e.g., metal naphthalocyanine dichloride) |
| 2. Trimethyl silicon chloride | 2. Silicon or other Naphthalocyanine dihydroxide |

Any combination of the above reactants and solvents would follow the same general reaction sequence discussed previously and illustrated in Examples 1 and 2.

While the invention has been described with preferred embodiments, it is to be understood that variations and modifications may be resorted to as will be apparent to those skilled in the art. Such variations and modification are to be considered within the purview and the scope of the claims appended hereto.

What is claimed is:

1. A method for preparing a naphthalocyanine compound which comprises:
   (a) reacting a cyclosiloxane with a nucleophile in a solvent to open the ring of the cyclosiloxane, and
   (b) reacting the ring-opened cyclosiloxane with a naphthalocyanine precursor and a capping group compound in a solvent.

2. The method of claim 1, wherein the cyclosiloxane is a cyclotrisiloxane or a cyclotetrasiloxane.

3. The method of claim 2, wherein the cyclotetrasiloxane is octamethylcyclotetrasiloxane.

4. The method of claim 1, wherein the nucleophile is an amide, hydroxide, siloxanate, silanolate, or alkoxide.

5. The method of claim 4, wherein the nucleophile is a metal amide, metal hydroxide, metal siloxanate, metal alkoxide, or an organic silanolate.

6. The method of claim 5, wherein the metal is an alkali metal.

7. The method of claim 1, wherein the capping group compound is an epoxide, alcohol or an aliphatic silicon chloride.

8. The method of claim 7, wherein the capping group is tripropylene glycol monomethylether or trimethyl silicon chloride.

9. The method of claim 1, wherein the naphthalocyanine precursor is a silicon, germanium, tin or tellurium naphthalocyanine.

10. The method of claim 9, wherein the naphthalocyanine precursor is a silicon naphthalocyanine dichloride or a silicon naphthalocyanine dihydroxide.

11. The method of claim 1, wherein the solvent is pyridine or tributylamine.

12. The method of claim 1, wherein a mixture of cyclosiloxanes is used.

13. The method of claim 1 comprising:
   (a) reacting hexamethyl cyclotrisiloxane with lithium amide to open the ring of the cyclotrisiloxane, and
   (b) reacting the ring-opened cyclotrisiloxane with silicon naphthalocyanine dichloride and tripropyleneglycol monomethylether.

14. A method for preparing an optical information storage medium which comprises a naphthalocyanine containing information layer and a substrate, which process comprises,
   (a) reacting a cyclosiloxane with a nucleophile in a solvent to open the ring of the cyclosiloxane,
   (b) reacting the ring-opened cyclosiloxane with a capping group compound and a naphthalocyanine precursor in a solvent, and
   (c) coating the recovered product of (b) onto the surface of a suitable substrate.

15. A method for preparing an optical information storage medium which comprises an information layer and substrate, which process comprises,
   (a) reacting hexamethyl cyclotrisiloxane with lithium amide in a solvent to open the ring of the cyclotrisiloxane,
   (b) reacting the ring-opened cyclotrisiloxane with tripropyleneglycol and naphthalocyanine dichloride in a solvent, and
   (c) coating the recovered product of (b) onto the surface of a suitable substrate.

16. The optical information storage medium of claim 14 wherein the recording medium comprises a polycarbonate substrate.

* * * * *